United States Patent [19]
Azzarelli et al.

[11] Patent Number: 5,936,575
[45] Date of Patent: Aug. 10, 1999

[54] APPARATUS AND METHOD FOR DETERMINING ANGLES-OF-ARRIVAL AND POLARIZATION OF INCOMING RF SIGNALS

[75] Inventors: Teodoro Azzarelli, Los Angeles; Ephraim Mendelovicz, Northridge, both of Calif.

[73] Assignee: Science and Applied Technology, Inc., San Diego, Calif.

[21] Appl. No.: 09/023,381

[22] Filed: Feb. 13, 1998

[51] Int. Cl.[6] ....................................................... H01Q 21/06
[52] U.S. Cl. ........................... 342/362; 342/374; 342/424; 342/442; 342/445
[58] Field of Search ..................................... 342/127, 361, 342/362, 374, 424, 442, 445; 367/125, 128

[56] References Cited

U.S. PATENT DOCUMENTS 4,540,139  9/1985  Levy .
5,404,144  4/1995  Vlannes .
5,457,465  10/1995  Collier .
5,568,154  10/1996  Cohen .

Primary Examiner—Thomas Tarcza
Assistant Examiner—Dao L. Phan
Attorney, Agent, or Firm—Michael Blaine Brooks

[57] ABSTRACT

An apparatus and method for determining the angles-of-arrival and the polarization states of incoming RF signals of unknown polarization using three or more RF sensing antenna elements of differing yet known orientations of polarization. The apparatus includes an array of broad gain, substantially identical, RF sensing antenna elements of differing yet known orientations of polarization, an antenna element selection network, RF receiver channels, processing means for determining uncorrected phase differences from received RF signal phases for pairs of antennas, processing means for determining received signal powers, processing means for determining from RF signal powers corrections to the phase difference errors caused by polarization diversity between pairs of antennas, processing means for correcting uncorrected phase differences with determined phase difference corrections, processing means for determining incoming RF signal frequencies, processing means for determining ambiguous and unambiguous angles-of-arrival of incoming RF signals and processing means for determining the polarization states of incoming RF signals.

25 Claims, 6 Drawing Sheets

APPARATUS AND METHOD FOR DETERMINING ANGLES-OF-ARRIVAL AND POLARIZATION OF INCOMING RF SIGNALS

FIELD AND BACKGROUND OF THE INVENTION

The present invention relates to the determining of angles-of-arrival of incoming RF signals with an antenna array of RF sensing elements. More particularly, the present invention relates to determining angles-of-arrival and the polarization of incoming RF signals as sensed by an antenna configuration in which antenna elements are mounted onto a non-planar surface in a fashion whereby the elements conform to the surface. This RF signal sensing array is also known as a conformal array of antenna elements. It is in such a non-planar array that the antenna elements of the conformal array are, by necessity, of differing, yet known, orientations of polarization.

The object of the present invention is to improve upon existing and well established interferometric techniques which apply measurements of phase differences between sets of antenna element pairs of similar orientations of their respective polarizations to determine unambiguous angles-of-arrival of incoming RF signals. The improvement manifests itself in the exploitation of amplitude measurements or the equivalent powers of incoming RF signals, which when processed according to the teachings of this invention, provide the required polarization induced phase correction allowing for the determination of the angles-of-arrival and the polarization of incoming RF signals with antenna elements of diverse orientations of polarization without the necessary application of iterative, linearly approximated solutions.

Conventional interferometry is a method reliant upon the measurement and processing of the electrical phase differences between the signals received at the ports of a number of antenna element pairs to derive the hitherto unknown direction of arrival in angle space of a received RF signal.

In the prior art of conventional interferometry, any polarization mismatch that exists between the set of receiving antennas and the polarization state of an incoming radar signal has no effect on the relative electrical phase of the voltages induced at the various antenna element terminals. While the polarization mismatch affects both the phase and the amplitude of the various voltages, it does so substantially identically, provided the polarization of the receiving antennas are all substantially equivalent. Thus, in conventional interferometry the phase difference, $\Delta\Psi$, between any pair of antennas is solely a function of the path difference traveled by the incoming wave-front as it impinges upon the particular antenna element pair. This relationship is expressed as $$\Delta\Psi = 2\pi d/\lambda \sin(\Theta) - 2n\pi \quad [1]$$

where the baseline, d, is the distances between the phase centers of the two antenna elements and $\lambda$ is the wavelength of the received radar signal. The angle $\Theta$ represents the unknown angle between the geometric normal to the baseline d and the direction of the incoming wave.

Through operational inversions of Equation 1, the angle $\Theta$ can be obtained in terms of the measured electrical phase difference $\Delta\Psi$ provided that a possible angular ambiguity, represented here by the term $2n\pi$, can be removed. This ambiguity to be resolved exists whenever the ratio $d/\lambda$ is larger than one-half.

Since the direction of an incoming wave is uniquely defined in space by two polar angles, two equations in the inverted form of Equation 1 using non-parallel baselines are required to obtain these angles-of-arrival. However, the removal of ambiguities may require additional pairs of antennas. Methods for removing these ambiguities are well known. One of several well known methods for resolving the angles-of-arrival uses a series of two-channel interferometers with progressively increasing separations such that the lowest separation is equal to $\lambda/2$ at the highest operating frequency. The first angles-of-arrival estimate is therefore the coarsest but is unambiguous. Using the remaining larger baseline interferometers subsequently refines this angles-of-arrival measurement. Another well-known method uses three or more interferometers with baselines greater than $\lambda/2$. However, the antenna separations are selected in specific ratios such that ideally, and in the absence of noise, only one pair of angles-of-arrival values is consistent with the measured phase differences and the associated ambiguity numbers.

Referring now to the prior art figures in detail wherein like reference numerals indicate like elements throughout the several views, the prior art can be illustrated by a flowchart of the process in FIG. 1 and a block diagram of the apparatus in FIG. 2. RF sensing elements of similar orientation of polarization 101 are selected by an RF selection network 102 so that receivers 104 may receive their respective voltages 103 and measure the signal frequency and the inter-antenna phase differences and then convert the analog measurements to digital form. The measured digitized phase differences 105 and measured digitized signal frequency 106 are sent to a digital interface 107 of a digital signal processor designated 108. Any polarization diversity among the individual antenna elements, intentional or otherwise, will produce errors in the respective phase differences of 105. These angular errors, should they arise, are not first accounted for and then corrected for in the prior art. Within the digital signal processor, the digitized phase differences 110 and the measured digitized signal frequency 109 in the reciprocal form of wavelength are applied to the resolution of angular ambiguities 113. The resolved unambiguous phase differences 114 and the wavelength 115 are applied to the determination of angles-of-arrival 116.

FIG. 2 illustrates a block diagram of a prior art apparatus. Individual RF sensing elements individually identified as 101 are mounted on a surface without curvature 202. Each element is connected to an element selection network 204 by an electrically conductive line 203. Each antenna element generates a voltage when excited by a RF wave-form. The element selection network selects pairs of antenna elements for the application of interferometry. At least two receiver channels 206 are required. The resulting antenna pairs sensed voltages are conveyed along a conductive harness 103 to a RF receiver 206. For each signal pair difference the individual receiver outputs a phase difference 207. Additionally, the receiver will output a measure of frequency of the RF signal 208. The phase differences 207 and frequency 208 of the RF signal are input signals to a special purpose computer 209.

SUMMARY OF THE INVENTION

The main object of the present invention is to provide a method and apparatus for determining angles-of-arrival and polarization states of incoming RF signals with an antenna array comprising a plurality of RF sensing elements of differing and substantially known orientations of polarization. The angles-of-arrival are the two body-relative polar angles of the direction of arrival of the received electromagnetic incoming wave. The emitter polarization angles define the electrical field characteristics of an incoming wave of a particular frequency.

It is often necessary to place antenna elements within the constraints of special orientations as required for practical configurations with non-planar surfaces. These antenna configurations are generally not amenable to the use of conventional interferometry due to the significant polarization diversity among the several antenna elements creating significant errors in the derived angles-of-arrival. The most significant failure of conventional interferometry when compared to polarization diverse interferometry is the inability of the former to account for the orientations of polarization of the antenna elements which are different by virtue of the geometrical constraints imposed by a curvilinear antenna array. Polarization diverse interferometry on the other hand, by its accounting for the receiving antenna elements' polarization diversity, is a generalization of the conventional interferometry. The conventional interferometric method fails to give sufficiently accurate estimates of angles-of-arrival because it does not account for the polarization-induced errors present in antenna arrays mounted upon curvilinear surfaces.

When the orientations of the polarization of the receiving antennas are not identical, Equation 1 must be modified to include an additional phase correcting term, $\Delta\Psi_P$, as follows:

$$\Delta\Psi = 2\pi d/\lambda \sin(\Theta) + \Delta\Psi_P - 2n\pi \quad [2]$$

This phase correction $\Delta\Psi_P$ is required here to account for the polarization diversity of the receiving antenna elements and is generally a function of: the polarization orientation of the elements; the two unknown angles-of-arrival; and two additional, hitherto unknown, emitter polarization parameters. Because of the dependence of the term $\Delta\Psi_P$ upon two angles-of-arrival and upon two emitter polarization parameters, all of which are unknown, Equation 2 is generally, a complex relationship of these four unknowns and the measurable phase difference. If one chooses to process only phase information, a minimum of four such relations (i.e., four antenna element pairs) are required to solve for the four unknowns. Moreover, in contrast with equations such as Equation 1, these coupled equations are transcendental in the angles-of-arrival and cannot be solved in closed form.

Below is described a new step in a process and a corresponding new elemental component in an apparatus for estimating the correcting phase $\Delta\Psi_P$ that extracts information contained within the amplitudes of the voltages of at least three antenna element terminals. Using this approach, the phase correcting term $\Delta\Psi_P$ is obtained directly from the voltage amplitude, that is, the root of the power, and the known antenna element phase center positions. Thus, one need not iteratively solve the equations expressed in terms of the angles-of-arrival and the accompanying emitter polarization parameters. After the correction is made, Equation 2 can be applied in exactly the same manner as one would apply Equation 1 in classical interferometry to remove any existing ambiguities and obtain angles of arrival.

ESTIMATION OF THE PHASE ANGLE CORRECTION

The conformal antenna element array configuration used in deriving the phase correction angle is shown in FIG. 4. In this configuration a number of substantially similar antenna elements are located along a circle and are linearly polarized along the radial direction. Thus both the position and the polarization direction of each antenna is defined in the plane containing the antenna element by a polar angle $\alpha$ 408 as shown in FIG. 4.

It can be shown that the amplitude squared or power, P, received at an antenna element always varies as a function of the antenna element position angle $\alpha$ as follows:

$$P = a + b\cos(2\alpha) + c\sin(2\alpha) \quad [3]$$

where a, b and c, the three amplitudes of Equation 3, are constant coefficients expressible in terms of the two polar angles-of-arrival $\theta$ and $\Phi$ and the hitherto unknown polarization of the incoming wave described by two emitter polarization angles $\gamma$ and $\delta$. The instantaneous electrical field contained in a plane perpendicular to the direction of the incoming wave is E. In an arbitrary Cartesian reference frame with axes x and y and unit vectors $\hat{x}$ and $\hat{y}$, E can be expressed as $$E = E_x \cos(\omega t)\hat{x} + E_y \cos(\omega t + \delta)\hat{y} \quad [4]$$

where $\delta$ is the phase by which the y-component leads the x-component, $\omega$ is the oscillatory frequency of the electrical field and the angle $\gamma$ describes the relative values of $E_x$ and $E_y$ as follows:

$$\gamma = \arctan(E_y/E_x) \text{ for } 90 \geq \gamma \geq 0 \text{ degrees.} \quad [5]$$

According to the teachings of the present invention, the coefficients, a, b and c, when determined from the measured values of signal power, P, contain all the information required to describe and correct for the effects of polarization upon the angles-of-arrival.

These coefficients can be estimated using a minimum of three, but preferably more, measured values of power, P, at various antenna locations, $a_i$, where i corresponds to antenna element location i. Where more than three measurements are used, the three coefficients are estimated using a simple least squares fit of the data to the above expression for the power P given by Equation 3. Other, more general optimal estimation techniques, such as the maximum likelihood or weighted least squares techniques can also be applied to estimate the coefficients a, b and c.

It can be shown that the coefficients, a, b and c, are related to the two unknown polarization parameters, $\gamma$ and $\delta$, and the angles-of arrival, $\theta$ and $\Phi$, as follows:

$$a = P_0(\cos^2\theta\cos^2\gamma + \sin^2\gamma) \quad [6.1]$$

$$b = P_0[(\cos^2\theta\cos^2\gamma - \sin^2\gamma)\cos 2\Phi + \sin 2\gamma\cos\delta\cos\theta\sin 2\Phi] \quad [6.2]$$

$$c = P_0[(\cos^2\theta\cos^2\gamma - \sin^2\gamma)\sin 2\Phi - \sin 2\gamma\cos\delta\cos\theta\cos 2\Phi] \quad [6.3]$$

These relationships are solvable for the polarization parameters in terms of the coefficients a, b and c, and the angles-of-arrival, $\theta$ and $\Phi$. Using these relationships, the polarization parameters $\gamma$ and $\delta$, can be eliminated and the antenna element voltages can be written in terms of the angles $\theta$ and $\Phi$, and the coefficients a, b and c as incorporated in Equation 3. To obtain the coefficients a, b, and c, one realizes that for every antenna position $a_i$, there will be a corresponding power measurement, $P_i$. In terms of the antenna element position and the three coefficients, this measurement can be expressed as $$P_i = a + b\cos 2a_i + c\sin 2a_i. \quad [7]$$

Thus, for three measurements, one can express the three simultaneous equations as:

$$\begin{Bmatrix} P_1 \\ P_2 \\ P_3 \end{Bmatrix} = \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \end{bmatrix} \begin{Bmatrix} a \\ b \\ c \end{Bmatrix}, \quad [8]$$

and solve for the three coefficients directly with a matrix inverse. The matrix expression for the three coefficients is $$\begin{Bmatrix} a \\ b \\ c \end{Bmatrix} = \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \end{bmatrix}^{-1} \begin{Bmatrix} P_1 \\ P_2 \\ P_3 \end{Bmatrix}. \quad [9]$$

Where there are more than three power measurements, a least-squares solution or pseudo-inverse will yield the coefficients a, b, and c.

Going one step further, using these relationships, the phase correction term $\Delta\Psi_P$ of Equation 2 can also be expressed in terms of the angles θ and Φ and the coefficients a, b and c. Unexpectedly, this functional dependence is independent of the two angles-of-arrival θ and Φ.

This much needed correcting term can now be expressed as $$\Delta\psi_P = \tan^{-1}\left\{ \frac{\sqrt{a^2 - b^2 - c^2}\sin(\alpha_1 - \alpha_2)}{a\cos(\alpha_2 - \alpha_1) + b\cos(\alpha_1 + \alpha_2) + c\sin(\alpha_1 + \alpha_2)} \right\} \quad [10]$$

where $a_1$ and $a_2$ are the position angles of the pair of antennas to which this phase difference angle correction will be applied.

Since this phase difference angle correcting term is now independent of the unknown two angles-of-arrival and of the two unknown polarization parameters of the incoming RF signal, it can be evaluated using the estimated values of coefficients a, b and c obtained exclusively from the measured power information of the incoming RF signal; then, it can be added as a correcting term to the measured electrical angle phase difference in Equation 2. This correcting action functionally reduces the polarization diverse interferometric angles-of-arrival estimation problem to that of the classical interferometry problem. That is, Θ can now be expressed in terms of Equation 11:

$$\Theta = \arcsin[\gamma(\Delta\Psi - \Delta\Psi_P + 2n\pi)/(2\pi d)] \quad [11]$$

FIG. 7 shows a flowchart of a direction-finding, DF, method exploiting the phase correcting steps of the present invention. For this implementation at least three separate channels of a receiver are processed in order to estimate the coefficients a, b and c. These estimates are then used to calculate the required phase correction for each pair of antennas involved in the angles-of-arrival ambiguity removal and estimation. Using the values of the coefficients a, b and c and the unambiguous angles-of-arrival θ and Φ, the polarization angles γ and δ can be determined using the relationship expressed in Equation 6.

DETAILED DESCRIPTION OF THE PREFERRED EMBODIMENTS

Figure 1:
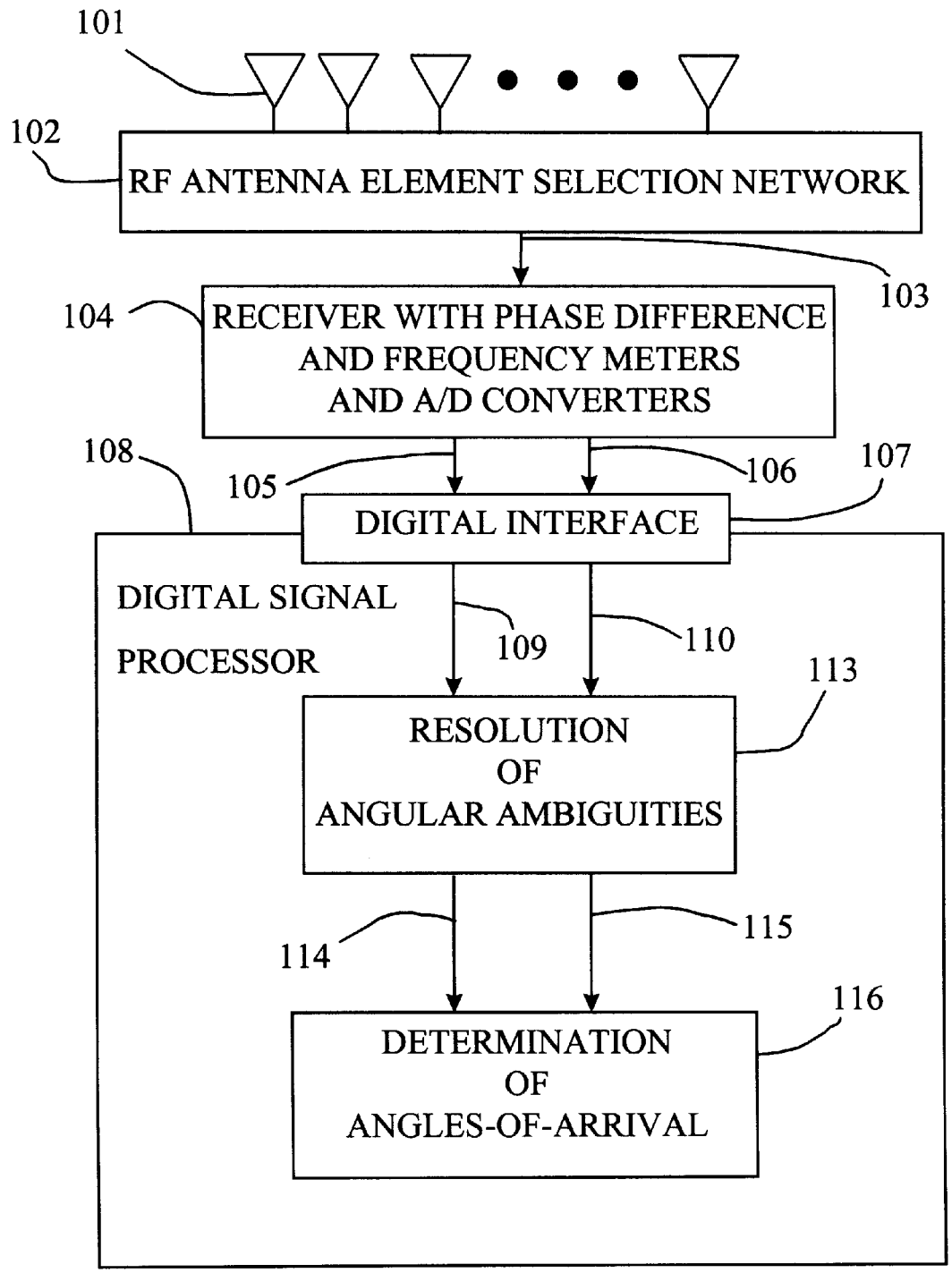
FIG. 1 is a flow chart of a process according to the prior art for determining angles-of-arrival of an emitting RF source with a RF antenna element array of substantially similar polarization orientations according to the prior art.
Figure 2:
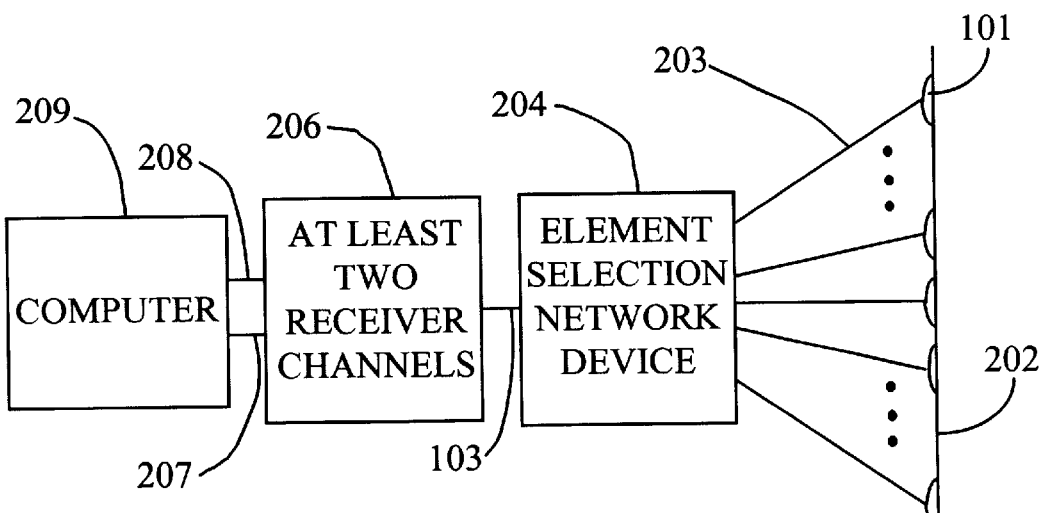
FIG. 2 is a block diagram of the prior art.
Figure 3:
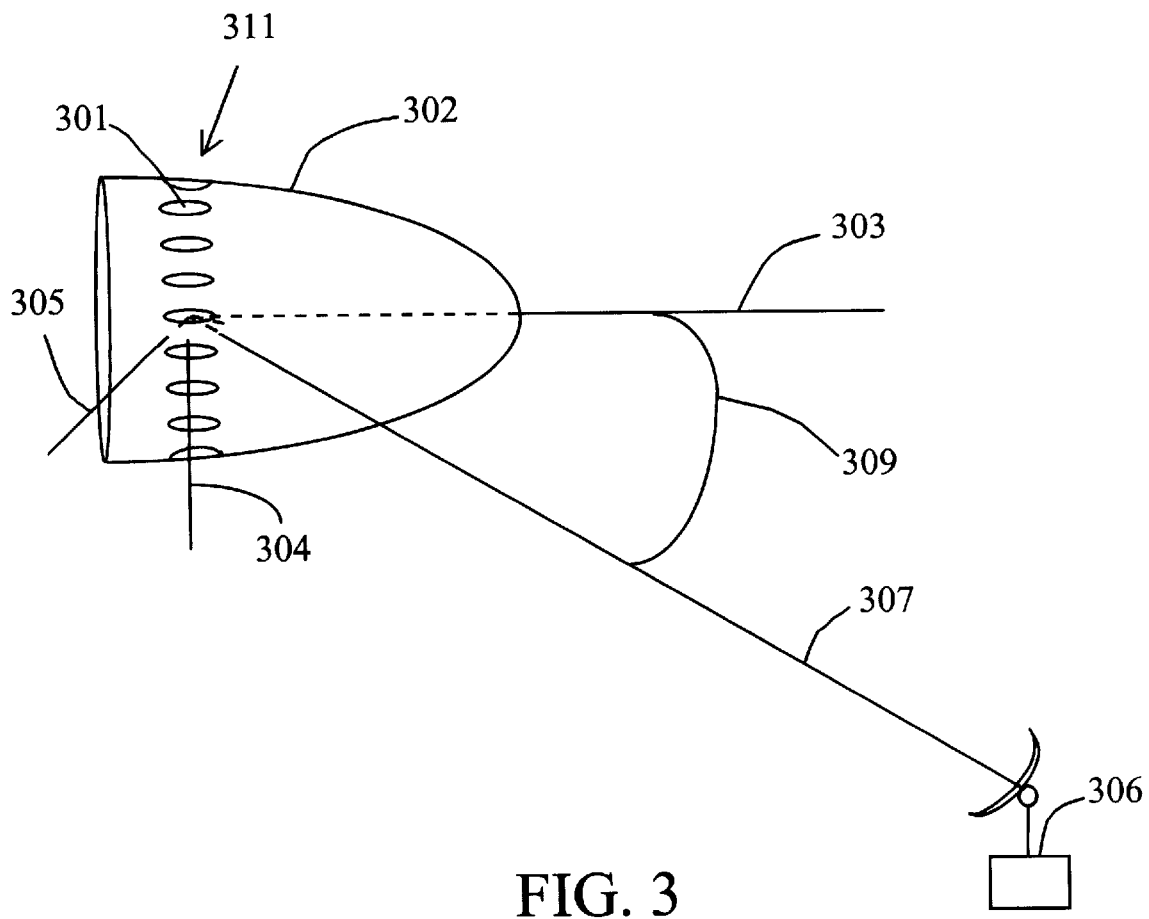
FIG. 3 illustrates the orientation and mounting of a RF antenna element array with diverse orientations of each elements' respective polarization with angles-of-arrival to a source of RF emissions used to explain the present invention.

Referring now to the other figures in detail wherein like reference numerals indicate like elements throughout the several views, FIG. 3 illustrates the orientation and mounting of a RF antenna element array 311 of diverse orientations of polarization with angles-of-arrival to a source of RF emissions 306 used to explain the present invention. An individual RF sensing element 301, when working in cooperation with other similar elements mounted on a surface 302, becomes an integral part of a RF antenna array 311. The mounting surface 302 illustrated is the shape of a cone with a rounded apex and could also be the shape of a right cone, a cylinder or any other convex or even concave surface. A principal axis 303 passes through a point at the center of the conical base of 302 and a point at the tip of the rounded apex. The antenna array 311 forms a ring around the principal axis 303. With the principal axis defining a forward horizontal directional axis, then 304 is a down directional axis and 305 is a "to the right" directional axis. A vector directly from the center of the RF antenna array 311 to the RF emitting source 306 is designated the line-of-sight 307 vector, and is the directional vector of the RF emitting source 306 relative to the RF antenna array 311. The angle created by the sides 303 and 307 is 309. The angle 309 is one of two of the angles-of-arrival, θ.

Figure 4:
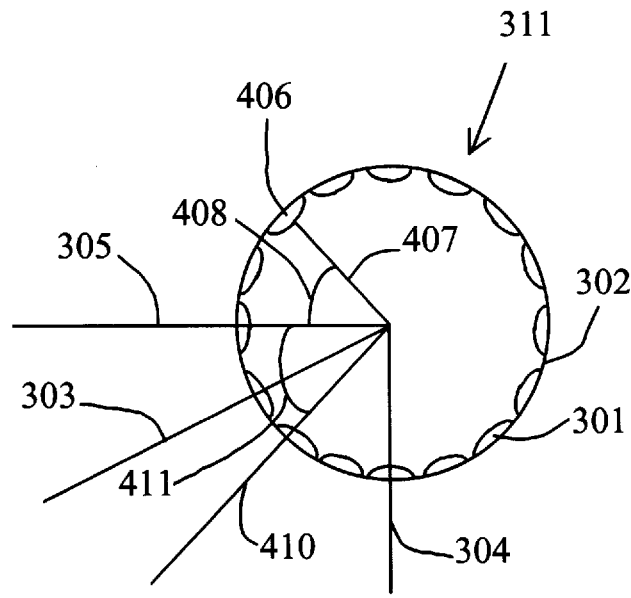
FIG. 4 illustrates a transverse cut through the mounting portion of a RF antenna element array of diverse orientations of each elements' respective polarization used to explain the present invention.

FIG. 4 illustrates the transverse view of the RF antenna element array 311 of diverse orientation of polarization used to explain the present invention. The transverse view illustrates the ring-shaped distribution of antenna elements comprising 311. The vector from the center of the ring 311 to an antenna element, 406, sensing a RF emission is designated 407. The angle between the sides of 305 and 407 is 408. The angle 408 is an antenna element position angle α. The projection of the line-of-sight vector 307 shown in FIG. 3 onto the plane of the array of elements is 410. The angle created by the body-fixed, "to the right" directional axis reference 305 and the line-of-sight vector projection 410 is the second angle-of-arrival 411, Φ.

Figure 5:
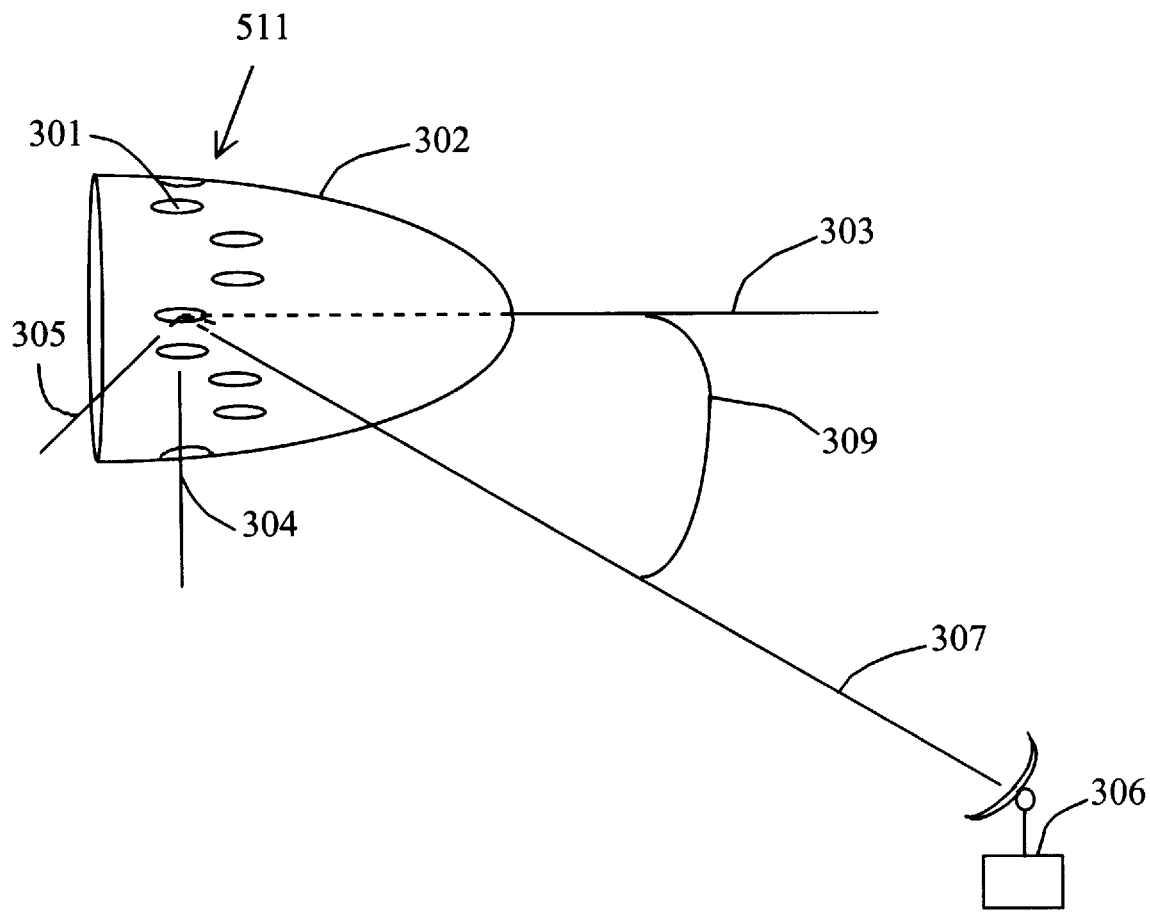
FIG. 5 illustrates the orientation and mounting of a second RF antenna element array of diverse orientations of each elements' respective polarization with angles-of-arrival to a source of RF emissions used to explain the present invention.

FIG. 5 illustrates an alternate orientation and mounting of a RF antenna element array 511 of diverse orientation of each element's polarization with angles-of-arrival to a source of RF emissions 306 used to explain the present invention. An individual RF sensing element 301, when working in cooperation with other similar elements mounted on a surface 302, becomes an integral part of the RF antenna array 511. The mounting surface 302 illustrated in the shape of a cone with a rounded apex and could also be the shape of a right cone, a cylinder or other convex or concave shapes. The principal axis 303 passes through a point at the center of the conical base of 302 and a point at the tip of the rounded apex. The antenna array 511 forms substantially parallel rings surrounding and perpendicular to the principal axis 303. Remaining designations within FIG. 5 are the same as in FIG. 3.

Figure 6:
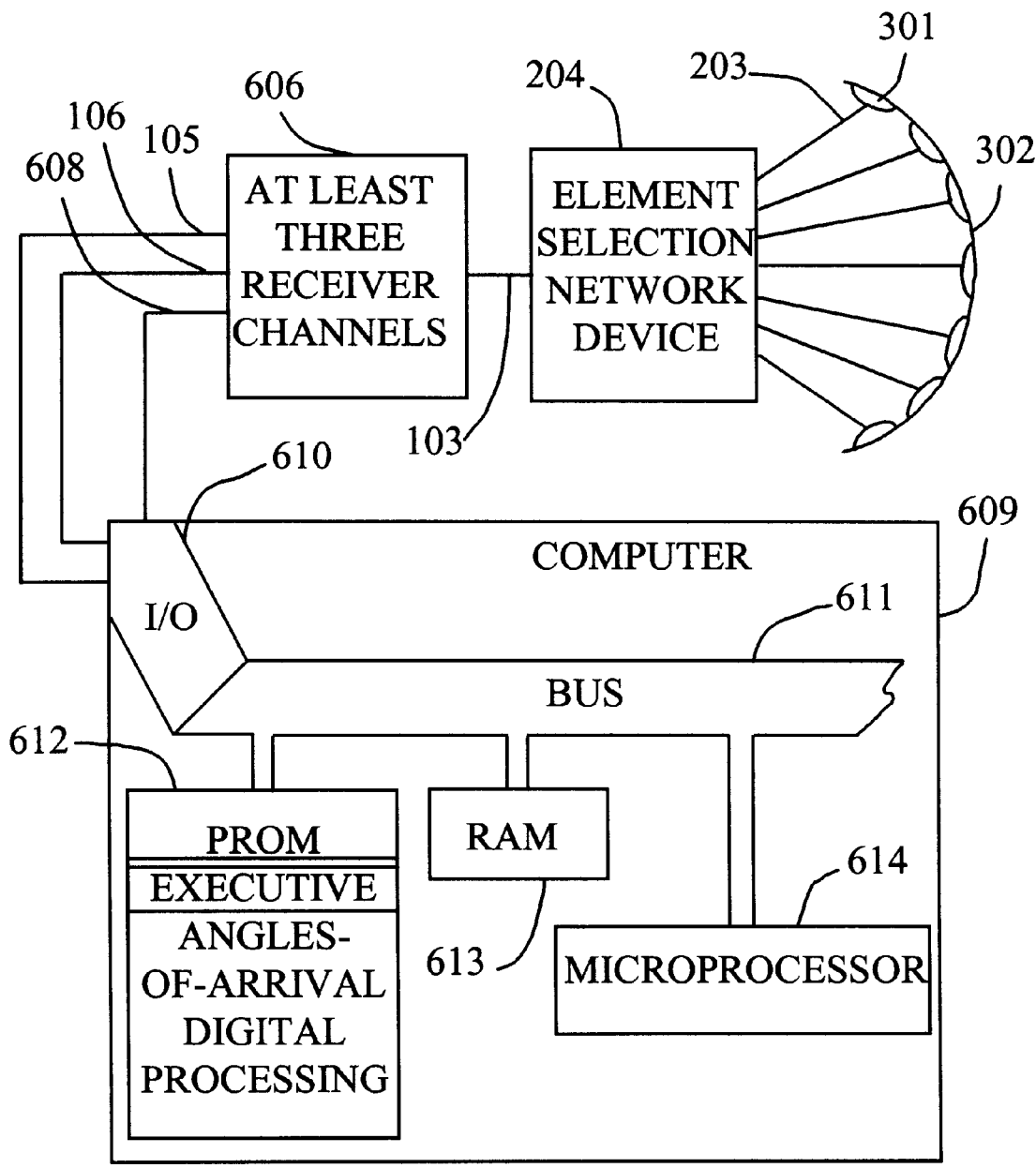
FIG. 6 is a block diagram of the present invention.

FIG. 6 illustrates a block diagram of an apparatus for the implementation of the present invention. Individual RF sensing elements, 301, are mounted on a surface of curvature 302. Each element is connected to an element selection network 204 by an electrically conductive line 203. Each antenna element generates a voltage when excited by a RF waveform. The element selection network selects pairs of antenna elements for the application of interferometry. At least three receiver channels 606 are required for the present invention. The resulting sensing antennas' produced voltages are conveyed along a conductive harness 103 to a RF receiver 606. With a receiver channel for each signal, the receiver outputs a phase difference 105 for each particular signal pair and for each signal the receiver outputs a measure of power 608 or a measure of signal amplitude that can later be squared. Additionally, the receiver will output a measure of frequency of the RF signal 106. The phase differences 105, powers 608 and frequency 106 of the RF signal are input signals to the input/output interface, the I/O, 610, of a special computer generally designated 609. Within the programmable, read-only memory, PROM, 612 of the computer, there is stored both the executive software for communicating along the data bus 611 with hardware components and executing software and the angles-of-arrival digital processing. Erasable PROM could also be applied as could alternative storage media such as magnetic tape and magnetic or optical discs. EEPROM, Flash EEPROM or nonvolatile programmable RAM could also be alternative program storage media. Additionally, this software is stored in random access memory, RAM, 613, when the apparatus begins operation and the angles-of-arrival processing is conducted within the microprocessor 614.

Figure 7:
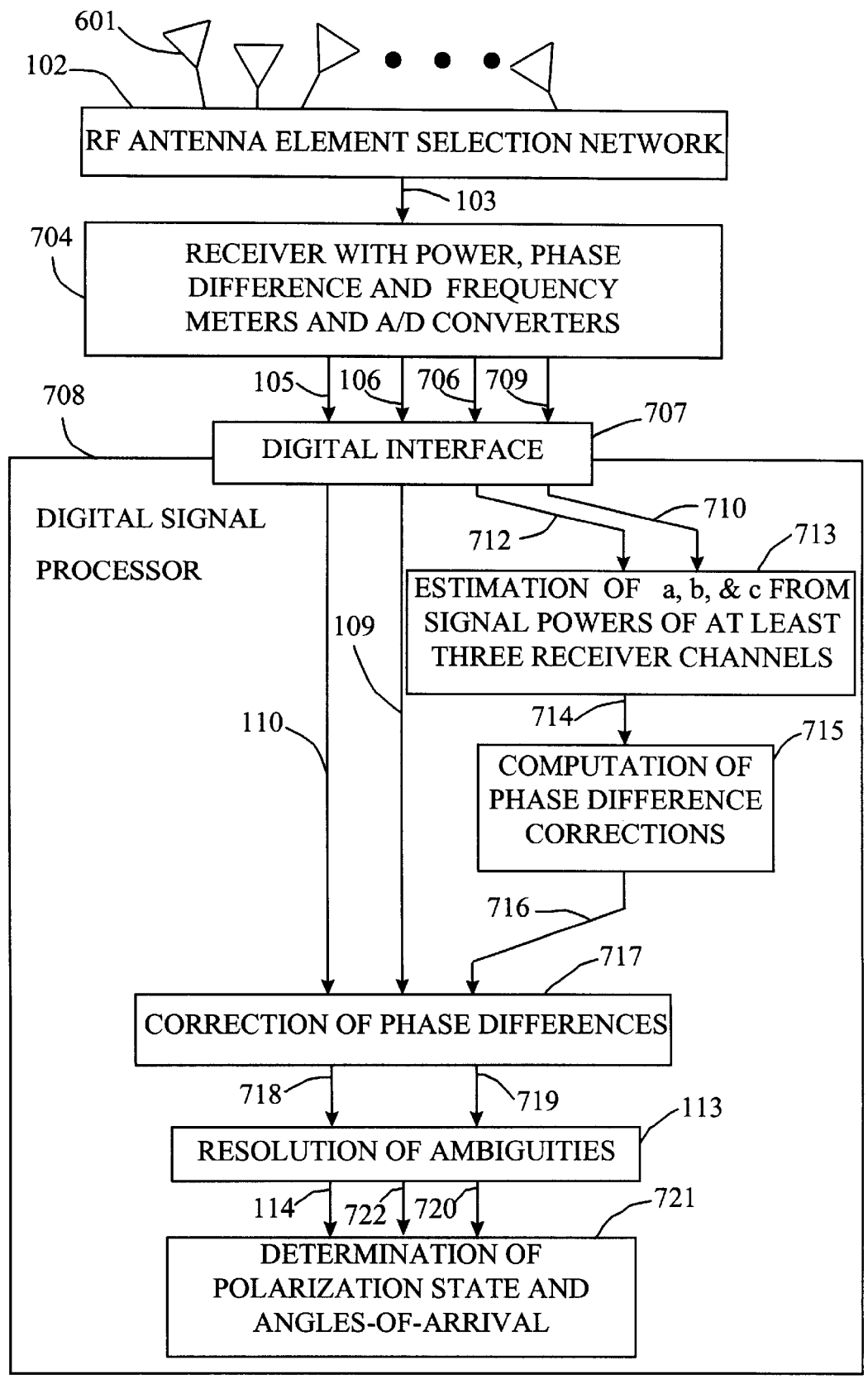
FIG. 7 is a flow chart of a process according to the present invention for determining angles-of-arrival for a RF antenna element array with elements of diverse orientations of polarization.

FIG. 7 illustrates a flowchart for implementing the present invention. Antenna elements of diverse orientation of polarization sense incoming RF waveforms and develop electrical voltages which are conveyed from a RF antenna element selection network 102 along a conducting harness 103 to receiver channels for producing paired differences within the receiver 704. The receiver produces digitized phase differences 105, digitized measures of power 706 and digitized measures of signal frequency 106. The phase differences 105, measures of power 706, measures of signal frequency 106, and the known angular orientations of the selected antenna elements 709 are inputs to a digital interface 707 of a digital signal processor 708. The digital measures of power within the digital signal processor 712 and the known digital angular orientations of the selected antenna elements 710 are used in the estimations of coefficients a, b and c and these coefficients 714 are used directly in the determination of the phase difference corrections 715. The point of novelty in this process is the application of the digital measures of power 712, when processed through 713 and 715, to correct the phase differences of an array of RF sensing elements of diverse polarity. It is at this stage that the digital uncorrected phase differences 110, the phase difference corrections 716 and the digital measured signal frequency within the digital signal processor 109 are used to produce a correction of phase differences 717. The corrected phase differences 718 and the digital measured signal frequency 719 are used in the resolution of ambiguities in possible angles-of-arrival 113. The resolved angles 114, corrected phase differences 722 and the digital measured signal frequency 720 are used in determining the angles-of-arrival and the polarization states 721.

Figure 8:
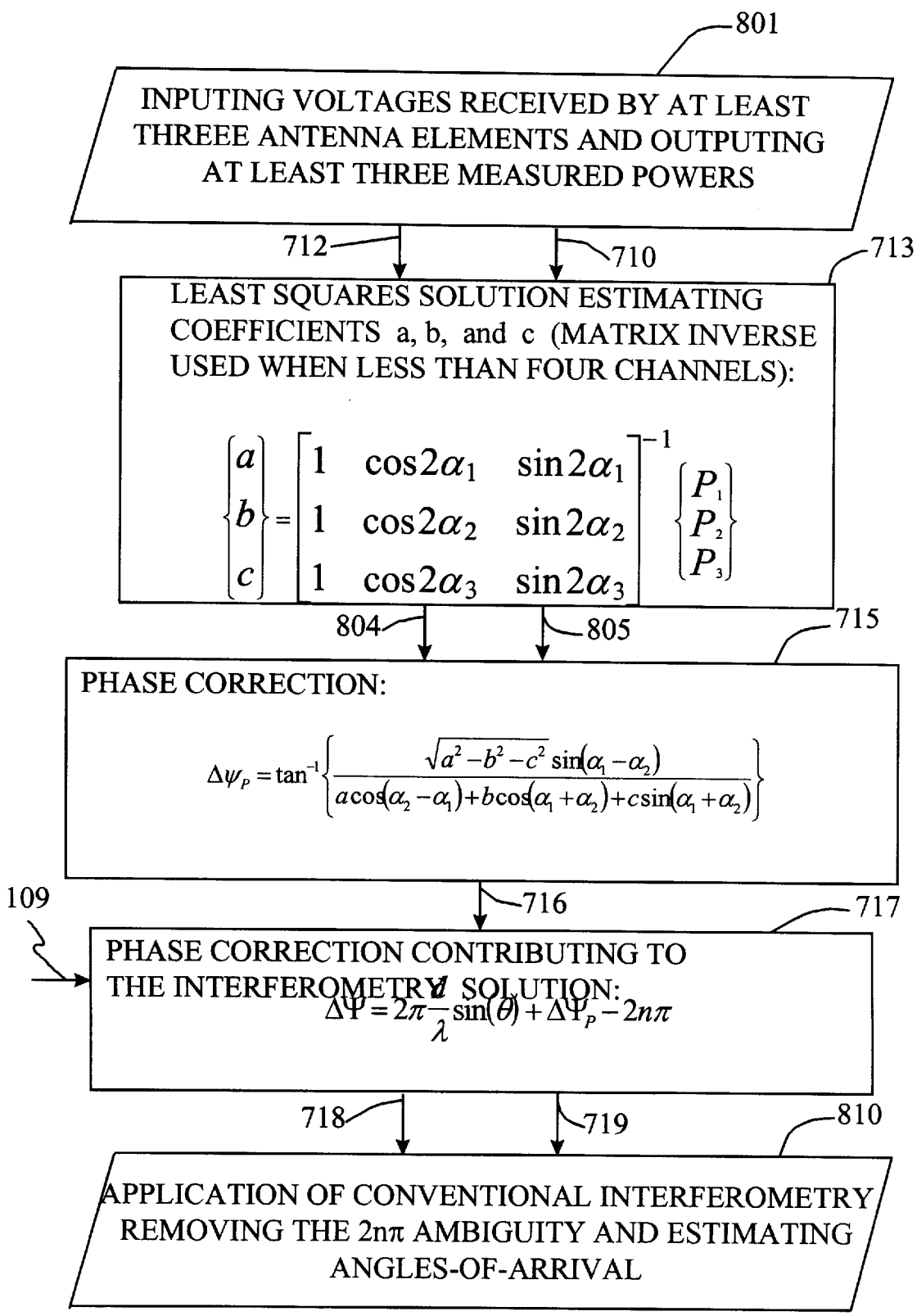
FIG. 8 is a flow chart of a process according to the present invention for correcting estimated signal phases for the application of interferometry based upon signal power measurements from an RF antenna element array with elements of diverse orientations of polarization.

FIG. 8 illustrates a detailed flowchart for implementing the point of novelty of the present invention. Voltages generated at individually selected antenna elements are received 801. Measured powers from at least three receivers 712 and the known angular orientations of the selected antenna elements 710 are applied according to 713 to estimate the coefficients a, b and c. The coefficients 804 and the angular orientations of two of the three antenna elements used in the least squares solution 805 are then applied according to 715 to determine the corresponding phase correction 716. The measured frequency 109 is applied in the reciprocal form of a wavelength along with the phase correction 716 to obtain the classical interferometric representation for phase difference 717. Then the last step is the application of conventional interferometry to the corrected phase 718 and the signal wavelength 719 removing the 2nπ ambiguity and estimating the angles-of-arrival 810.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What we claim is:

1. An apparatus for determining angles-of-arrival and polarization states of a plurality of incoming electromagnetic waves comprising:

(a) an antenna element selection network for electrically and switchably conducting said plurality of incoming electromagnetic waves as voltages to a receiver comprising at least three channels for receiving said plurality of incoming electromagnetic waves as voltages; said antenna element selection network providing at least three output signals;

(b) means for determining signal power of said voltages of said plurality of incoming electromagnetic waves as produced by said receiver;

(c) means for determining frequencies of said plurality of incoming electromagnetic waves;

(d) a plurality of differencing junctions for determining phase differences of said plurality of incoming electromagnetic waves as produced by said receiver;

(e) processing means for determining corrections to said phase differences of said plurality of incoming electromagnetic waves from said signal power of said voltages;

(f) at least one summing junction for correcting said phase differences with said corrections; and (g) processing means for resolving angular ambiguities with said frequencies of said plurality of incoming electromagnetic waves and the corrected phase differences whereby said angles-of-arrival and polarization of incoming electromagnetic waves are determined.

2. An apparatus as claimed in claim 1 wherein said plurality of incoming electromagnetic waves are a plurality of incoming RF signals.

3. An apparatus as claimed in claim 2 further comprising an antenna array; said antenna array comprising at least three RF sensing elements of differing and substantially known orientations of polarization for converting said plurality of incoming RF signals into voltages.

4. An apparatus as claimed in claim 3 wherein each RF sensing element phase center of said antenna array is substantially coplanar in relation to all other phase centers of said RF sensing elements, substantially circular in positional planar relationship to all other phase centers of elements, and possesses a polarization orientation substantially radial from the geometric center of said antenna array.

5. An apparatus as claimed in claim 3 wherein said antenna array comprises:

(a) a first sub-array; said first sub-array comprising each element phase center of first approximately half of said plurality of RF sensing elements; substantially coplanar, substantially circular in positional planar relationship to all other centers of elements, and possessing a polarization orientation substantially radial from the geometric center of said first sub-array; and (b) a second sub-array; said second sub-array comprising each element phase center of second approximately half of said plurality of RF sensing elements; substantially coplanar, substantially circular in positional planar relationship to all other phase centers of elements, substantially parallel to said first sub-array and possessing a polarization orientation substantially radial from the geometric center of said second sub-array.

6. An apparatus as claimed in claim 3 additionally wherein each RF sensing element phase center of said antenna array is substantially coplanar in relation to all other phase centers of said RF sensing elements, substantially circular in positional planar relationship to all other phase centers of said elements; possessing a polarization orientation substantially radial from the geometric center of said antenna array; each orientation of polarization skewed out of the plane of the center of said antenna array by a substantially equivalent angle; each element selectable by said antenna element selection network for electrically and switchably conducting said plurality of incoming electromagnetic waves as voltages to said receiver comprising at least two additional channels for receiving said plurality of incoming electromagnetic waves as voltages; said antenna element selection network providing at least two additional output signals.

7. An apparatus as claimed in claim 1 wherein said means for determining signal power of said voltages of said plurality of incoming electromagnetic waves as produced by said receiver is at least three square law detectors wherein each channel for receiving transmits to a unique member of said at least three square law detectors.

8. An apparatus as claimed in claim 7 wherein said square law detectors comprise synchronous detectors, whereby squares of in-phase and quadrature components of said voltages are summed.

9. An apparatus as claimed in claim 7 wherein said square law detectors comprise square law diode detectors, amplifiers and analog-to-digital converters, whereby squares of in-phase and quadrature components of said voltages are summed.

10. An apparatus as claimed in claim 2 wherein said processing means for determining phase differences of said plurality of incoming RF signals as produced by said receiver comprises at least three channels for receiving includes a plurality of phase detectors; said plurality of phase detectors comprising mixers and filters for each combination of pairs of said at least three channels for receiving.

11. An apparatus as claimed in claim 4 wherein said processing means for determining corrections to said phase differences of said plurality of incoming RF signals from said signal power of said voltages comprises:

(a) estimating means for determining from said signal power of said voltages a first coefficient, a, a second coefficient, b, and a third coefficient, c, for each of said voltages; and (b) estimating means for determining said corrections from combining said first coefficient, a, said second coefficient, b, and said third coefficient, c, for each of said voltages.

12. An apparatus as claimed in claim 11 wherein said first coefficient, a, said second coefficient, b, and said third coefficient, c are determined for constant antenna position angles, $\alpha_i$, by solving at least three simultaneous linear equations where $$\begin{Bmatrix} a \\ b \\ c \end{Bmatrix} = \text{pseudo-inverse} \begin{bmatrix} 1 & \cos2\alpha_1 & \sin2\alpha_1 \\ 1 & \cos2\alpha_2 & \sin2\alpha_2 \\ 1 & \cos2\alpha_3 & \sin2\alpha_3 \\ \vdots & \vdots & \vdots \\ 1 & \cos2\alpha_i & \sin2\alpha_i \end{bmatrix} \begin{Bmatrix} P_1 \\ P_2 \\ P_3 \\ \vdots \\ P_i \end{Bmatrix}$$

13. An apparatus as claimed in claim 11 wherein said phase correction, $\Delta\Psi_P$, for a particular incoming RF signal is determined with $$\Delta\psi_P = \tan^{-1}\left\{\frac{\sqrt{a^2-b^2-c^2}\sin(\alpha_1-\alpha_2)}{a\cos(\alpha_2-\alpha_1)+b\cos(\alpha_1+\alpha_2)+c\sin(\alpha_1+\alpha_2)}\right\}.$$

14. An apparatus as claimed in claim 11 wherein said estimating means for determining from said signal power of said voltages said first coefficient, said second coefficient, and said third coefficient comprises a least squares solution.

15. An apparatus as claimed in claim 6 wherein said processing means for determining corrections to said phase differences of said plurality of incoming RF signals from said signal power of said voltages comprises:

(a) estimating means for determining from said signal power of said voltages a first coefficient, a second coefficient, a third coefficient, a fourth coefficient and a fifth coefficient for each of said voltages; and (b) estimating means for determining said corrections from combining said first coefficient, said second coefficient, said third coefficient, said fourth coefficient and said fifth coefficient for each of said voltages.

16. An apparatus as claimed in claim 11 wherein said estimating means for determining from said signal power of said voltages said first coefficient, said second coefficient, and said third coefficient comprises a maximum likelihood solution.

17. An apparatus as claimed in claim 2 wherein said processing means for resolving angular ambiguities comprises selecting one or more baselines of said RF sensing elements separated by less than one-half wavelength of at least one of said incoming RF signals.

18. An apparatus as claimed in claim 2 wherein said processing means for resolving angular ambiguities comprises pairs of parallel baselines for resolving in like manner as three or more collinear antennas with baselines greater than λ/2; collinear equivalent separations existing in compatibly specific ratios.

19. An apparatus as claimed in claim 2 wherein said means for determining frequencies of said plurality of incoming RF signals comprises a time-based differencing of said plurality of incoming RF signals circuit as conducted within at least one channel of said receiver.

20. An apparatus as claimed in claim 2 wherein each element center of said plurality of RF sensing elements is substantially coplanar and possesses a polarization orientation substantially coplanar to the substantially coplanar elements.

21. An apparatus as claimed in claim 1 wherein said processing means for determining corrections to said phase differences of said plurality of incoming RF signals from said signal power of said voltages receives prior knowledge of at least one initial approximate angle-of-arrival value of at least one of said plurality of incoming RF signals.

22. An apparatus as claimed in claim 1 wherein said processing means for determining corrections to said phase differences of said plurality of incoming RF signals from said signal power of said voltages receives prior knowledge of at least one initial approximate polarization state of at least one of said incoming RF signals.

23. A method for determining angles-of-arrival and polarization states of a plurality of incoming electromagnetic waves comprising the steps of:

(a) converting said plurality of incoming electromagnetic waves into voltages with an antenna array comprising a plurality of RF sensing elements of differing substantially known polarization orientations;

(b) electrically and switchably conducting said voltages from a plurality of said RF sensing elements to a receiver comprising at least three channels for receiving said produced voltages with an antenna selection network means; said antenna selection network means providing at least three output signals;

(c) determining signal power of said voltages of said plurality of incoming RF signals as produced by said receiver;

(d) determining frequencies of said sensed incoming RF signals;

(e) determining phase differences of said sensed incoming RF signals as produced by said receiver;

(f) determining corrections to said phase differences of said sensed incoming RF signals from said signal power of said voltages by first determining the coefficients a, b, and c as defined by:

$$\begin{Bmatrix} a \\ b \\ c \end{Bmatrix} = \text{psuedo-inverse} \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \\ \vdots & \vdots & \vdots \\ 1 & \cos 2\alpha_i & \sin 2\alpha_i \end{bmatrix} \begin{Bmatrix} P_1 \\ P_2 \\ P_3 \\ \vdots \\ P_i \end{Bmatrix}$$

and then determining said corrections directly as defined by:

$$\Delta \psi_P = \tan^{-1}\left\{\frac{\sqrt{a^2 - b^2 - c^2}\sin(\alpha_1 - \alpha_2)}{a\cos(\alpha_2 - \alpha_1) + b\cos(\alpha_1 + \alpha_2) + c\sin(\alpha_1 + \alpha_2)}\right\};$$

(g) correcting said phase differences with said corrections with at least one summing junction; and (h) resolving angular ambiguities with said frequencies of said sensed incoming RF signals and the corrected phase differences whereby said angles-of-arrival and polarization of incoming RF signals are determined.

24. An improved method for determining angles-of-arrival and polarization states of a plurality of incoming electromagnetic waves of the type wherein said plurality of incoming electromagnetic waves are converted into voltages with an antenna array of the type wherein a plurality of RF sensing elements of differing substantially known polarization orientations are arranged in conformal rings, said voltages are electrically and switchably conducted from a plurality of said RF sensing elements to a receiver comprising at least three channels for receiving said produced voltages with an antenna element selection network providing at least three output signals, signal power and frequency of said voltages of said plurality of incoming RF signals and relative phase are determined by differencing selected receiver channels within said receiver, and angular ambiguities are resolved, the improvement comprising:

(a) determining corrections to said phase differences of said sensed incoming RF signals from said signal power of said voltages and known antenna element orientations by first determining coefficients a, b and c according to:

$$\begin{Bmatrix} a \\ b \\ c \end{Bmatrix} = \text{psuedo-inverse} \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \\ \vdots & \vdots & \vdots \\ 1 & \cos 2\alpha_i & \sin 2\alpha_i \end{bmatrix} \begin{Bmatrix} P_1 \\ P_2 \\ P_3 \\ \vdots \\ P_i \end{Bmatrix}$$

and then determining the corrections according to:

$$\Delta \psi_P = \tan^{-1}\left\{\frac{\sqrt{a^2 - b^2 - c^2}\sin(\alpha_1 - \alpha_2)}{a\cos(\alpha_2 - \alpha_1) + b\cos(\alpha_1 + \alpha_2) + c\sin(\alpha_1 + \alpha_2)}\right\}; \text{ and}$$

(b) correcting said phase differences with said corrections with at least one summing junction prior to resolving angular ambiguities with said frequencies of said sensed incoming RF signals and the corrected phase differences whereby said angles-of-arrival and polarization of incoming RF signals are determined.

25. An apparatus for determining angles-of-arrival and polarization states of a plurality of incoming electromagnetic waves comprising:

(a) an antenna element selection network for electrically and switchably conducting said plurality of incoming electromagnetic waves as voltages to a receiver comprising at least three channels for receiving said plurality of incoming electromagnetic waves as voltages; said antenna element selection network providing at least three output signals;

(b) at least three square law detectors wherein each channel for receiving transmits to a unique member of said at least three square law detectors for determining signal power of said voltages of said plurality of incoming electromagnetic waves as produced by said receiver;

(c) a circuit for time-based differencing of said plurality of incoming RF signals as conducted within at least one channel of said receiver for determining frequencies of said plurality of incoming electromagnetic waves;

(d) a plurality of differencing junctions for determining phase differences of said plurality of incoming electromagnetic waves as produced by at least three receiver channels within said receiver;

(e) processing means for determining corrections to said phase differences of said plurality of incoming electromagnetic waves from said signal power of said voltages by first determining coefficients a, b and c from said signal power and known antenna element orientations according to:

$$\begin{Bmatrix} a \\ b \\ c \end{Bmatrix} = \text{psuedo-inverse} \begin{bmatrix} 1 & \cos 2\alpha_1 & \sin 2\alpha_1 \\ 1 & \cos 2\alpha_2 & \sin 2\alpha_2 \\ 1 & \cos 2\alpha_3 & \sin 2\alpha_3 \\ \vdots & \vdots & \vdots \\ 1 & \cos 2\alpha_i & \sin 2\alpha_i \end{bmatrix} \begin{Bmatrix} P_1 \\ P_2 \\ P_3 \\ \vdots \\ P_i \end{Bmatrix}$$

and then determining the corrections according to:

$$\Delta \psi_P = \tan^{-1} \left\{ \frac{\sqrt{a^2 - b^2 - c^2} \sin(\alpha_1 - \alpha_2)}{a\cos(\alpha_2 - \alpha_1) + b\cos(\alpha_1 + \alpha_2) + c\sin(\alpha_1 + \alpha_2)} \right\}.$$

(f) at least one summing junction for correcting said phase differences with said corrections; and processing means for resolving angular ambiguities with said frequencies of said plurality of incoming electromagnetic waves and the corrected phase differences whereby said angles-of-arrival and polarization of incoming electromagnetic waves are determined.

* * * * *

UNITED STATES PATENT AND TRADEMARK OFFICE
CERTIFICATE OF CORRECTION

| | | |
|---|---|---|
| PATENT NO. | : 5,936,575 | |
| APPLICATION NO. | : 09/023381 | |
| DATED | : August 10, 1999 | |
| INVENTOR(S) | : Teodoro Azzarelli and Ephraim Mendelovicz | |

It is certified that error appears in the above-identified patent and that said Letters Patent is hereby corrected as shown below:

In the drawings:

In FIG. 8, in box labeled as reference numeral "801," change "INPUTING" in first line to --INPUTTING--, change "THREEE" and "OUTPUTING" in second line to --THREE-- and --OUTPUTTING--, and in third line, insert --OF-- prior to --AT LEAST THREE-- in box labeled as reference numeral "717," correct overlapping of text and equation so that it reads in its entirety:
PHASE CORRECTION CONTRIBUTING TO
    THE INTERFEROMETRY SOLUTION:

$$\Delta\Psi = 2\pi \frac{d}{\lambda}\sin(\theta) + \Delta\Psi_p - 2n\pi$$

(As shown below.)

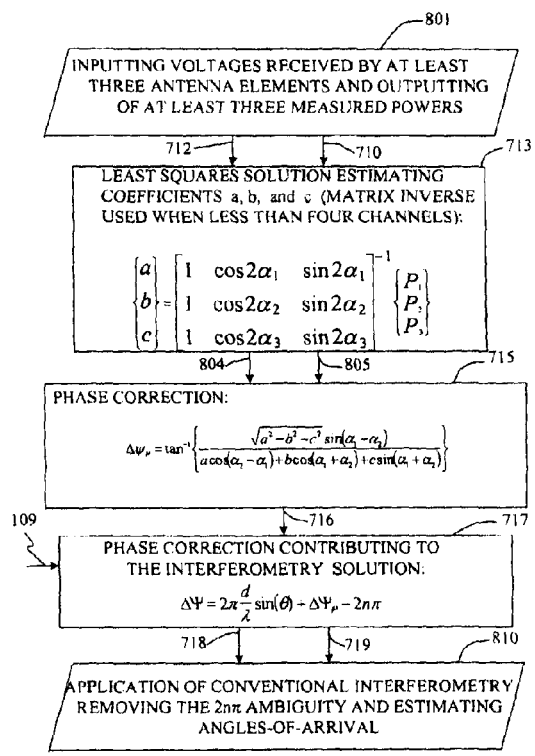

FIG. 8

UNITED STATES PATENT AND TRADEMARK OFFICE
CERTIFICATE OF CORRECTION

PATENT NO. : 5,936,575
APPLICATION NO. : 09/023381
DATED : August 10, 1999
INVENTOR(S) : Teodoro Azzarelli and Ephraim Mendelovicz It is certified that error appears in the above-identified patent and that said Letters Patent is hereby corrected as shown below:

| | | |
|---|---|---|
| COLUMN 4, | LINE 12, | change "$P=a+b\cos(2a)+c\sin(2a)$" to --$P=a+b\cos(2\alpha)+c\sin(2\alpha)$-- |
| COLUMN 4, | LINE 21, | change "unit vectors $\hat{x}$ and $\hat{y}$," to --unit vectors $\hat{x}$ and $\hat{y}$,-- |
| COLUMN 5, | LINE 8, | change "1 $\cos2\alpha_1$ $\sin2a_1$" to --1 $\cos2\alpha_1$ $\sin2\alpha_1$-- |
| COLUMN 5, | LINE 36, | change "where $a_1$ and $a_2$" to --where $\alpha_1$ and $\alpha_2$-- |
| COLUMN 5, | LINE 49, | change "That is, $\Theta$" to -- That is, $\theta$-- |
| COLUMN 5, | LINE 52, | change "$\Theta$" to --$\theta$-- |
| COLUMN 6, | LINE 47, | change "The antenna" to --The RF antenna-- |
| COLUMN 6, | LINE 61, | change "the ring 311" to --the ring of RF antenna element array 311-- |
| COLUMN 7, | LINE 36, | change "powers 608" to --measure of power 608-- |
| COLUMN 7, | LINE 53, | change "RF waveforms and" to --RF waveforms 601 and-- |
| COLUMN 8, | LINES 2-3, | change "digital measures of power 712," to --digital measures of power within the digital signal processor 712,-- |
| COLUMN 8, | LINE 26, | change "the measured frequency 109" to --the measured digitized signal frequency 109-- |
| COLUMN 8, | LINE 31, | change "removing the $2n\pi$" to --removing the $2n\pi$-- |

UNITED STATES PATENT AND TRADEMARK OFFICE
CERTIFICATE OF CORRECTION

PATENT NO.        : 5,936,575
APPLICATION NO.   : 09/023381
DATED             : August 10, 1999
INVENTOR(S)       : Teodoro Azzarelli and Ephraim Mendelovicz It is certified that error appears in the above-identified patent and that said Letters Patent is hereby corrected as shown below:

CLAIM 8,   COLUMN 9,   LINE 62,   change "said square" to --said at least three square--

CLAIM 9,   COLUMN 9,   LINE 66,   change "said square" to --said at least three square--

Signed and Sealed this

Twelfth Day of August, 2008

JON W. DUDAS
*Director of the United States Patent and Trademark Office*